United States Patent [19]

Sargent

[11] Patent Number: 4,873,662

[45] Date of Patent: Oct. 10, 1989

[54] INFORMATION HANDLING SYSTEM AND TERMINAL APPARATUS THEREFOR

[75] Inventor: Desmond J. Sargent, Felixstowe, England

[73] Assignee: The Post Office, United Kingdom

[21] Appl. No.: 178,307

[22] Filed: Aug. 15, 1980

Related U.S. Application Data

[63] Continuation of Ser. No. 814,922, Jul. 12, 1977, abandoned.

[30] Foreign Application Priority Data

Jul. 20, 1976 [GB] United Kingdom ............... 30137/76

[51] Int. Cl.[4] .................................................. G06F 13/00
[52] U.S. Cl. .............................. 364/900; 364/957.3; 364/963
[58] Field of Search ... 364/200 MS File, 900 MS File; 434/323, 322

[56] References Cited

U.S. PATENT DOCUMENTS

| | | | |
|---|---|---|---|
| 3,297,998 | 1/1967 | Klein .................................... | 364/200 |
| 3,344,401 | 9/1967 | MacDonald . | |
| 3,389,404 | 6/1968 | Koster .................................. | 364/200 |
| 3,405,457 | 10/1968 | Bitzer .................................. | 434/323 |
| 3,566,370 | 2/1971 | Worthington, Jr. et al. ....... | 364/200 |
| 3,670,322 | 6/1972 | Mallebrein . | |
| 3,688,276 | 8/1972 | Quinn .................................. | 364/200 |
| 3,704,453 | 9/1972 | Backwell et al. . | |
| 3,740,728 | 3/1973 | Pullen . | |
| 3,792,462 | 6/1974 | Casey et al. . | |
| 3,842,405 | 3/1974 | Key et al. . | |
| 3,848,232 | 11/1974 | Leibler et al. ...................... | 364/200 |
| 3,900,835 | 8/1975 | Bell et al. ............................ | 364/200 |
| 3,980,994 | 9/1926 | Ying et al. .......................... | 364/200 |
| 3,996,671 | 12/1976 | Foster .................................. | 434/323 |
| 3,999,307 | 12/1976 | Tsuda et al. ........................ | 434/323 |
| 4,047,248 | 9/1977 | Lyman et al. ...................... | 364/900 |
| 4,065,810 | 12/1977 | Cramer et al. ...................... | 364/200 |
| 4,130,881 | 12/1978 | Haessler et al. .................... | 364/900 |

FOREIGN PATENT DOCUMENTS 1389314 of 0000 United Kingdom .

OTHER PUBLICATIONS

NTZ, vol. 28, No. 6, 1975-6, German Language article.
Nachrichtentechnische Zeitschrift, vol. 28, No. 6, Jun. 1975, pp. 214-218.
IBM Technical Disclosure Bulletin, vol. 16, No. 9, Feb. 1974, pp. 2932-2934.
AFIPS Joint Computer Conference 1976, vol. 45, Proc. Nat. Comp. Conf. NY, 7-10 Jun. 1976, pp. 789-794.
"Design of Man—Computer Dialogues", J. Martin, Prentice-Hall (1973), pp. 110-120.
"Computer System Organisation & Programming", Science Research Associates Inc., H. Katzan (May 1976), pp. 318-334.
"Teletext Data Decoding—The LSI Approach", by Brian Norris and Bob Parsons, pp. 1-7, of unknown date.
"View Data—An Interactive Information Service For The General Public", by S. Fedida, Proceedings European Computing Conference on Communications Networks, Sep. 1975, pp. 261-282.
"View Data—Development of Computer-Based Information Media For The General Public", by S. Fedida, Second Internation Symposium on Subscribers Loops and Services, 3-7 May 1976.
IBM Technical Disclosure Bulletin, vol. 16, No. 9, Feb. 1974, "Message Control for Computer Output Display", by Hartman et al., pp. 2932-2934.

*Primary Examiner*—Eddie P. Chan
*Attorney, Agent, or Firm*—Nixon & Vanderhye

[57] ABSTRACT

Informaton for display at a terminal apparatus of a computer is stored in blocks the first part of which contains the information which is actually displayed at the terminal and the second part of which contains information relating to the display and which may be used to influence the display at the time or in response to a keyboard entry signal. For example, the second part of the block could include information for providing the complete address of an another block which would be selected by the operation of a selected key of the keyboard. The second part of the block could alternatively influence the format and/or color of the display at the terminal. When a block is read from the store of the computer the second part is retained in another store which may be located in the terminal or in the computer itself or perhaps both. The invention is particularly useful in reducing the complexity of the operating protocol of the computer.

7 Claims, 2 Drawing Sheets

ND TERMINAL APPARATUS THEREFOR

INFORMATION HANDLING SYSTEM AND TERMINAL APPARATUS THEREFOR

This is a continuation of application Ser. No. 814,922 filed 7/12/77, now abandoned.

BRIEF SUMMARY OF THE INVENTION

This invention relates to an information handling system in which information is derived from a computer at a remote point and transmitted via the public telephone network to terminal apparatus. The invention also includes the terminal apparatus itself.

It has been proposed to provide for domestic and/or business consumers a simplified form of computer terminal by means of which information stored in a computer can be obtained from it via the public telephone network. The form of the terminal is different from a conventional computer terminal, both in the simplicity of its operation and in the form of its display. The display is of the form of a page of data and is reproduced on a cathode-ray tube screen which may be part of a domestic television receiver or may be a special purpose apparatus for this function. Instead of a cathode-ray tube screen, a special purpose alphanumeric display may be used. Initially the data is displayed on the screen in the form of a sequence of progressively more detailed indices by means of which an operator is enabled to key-in to a key pad provided for the terminal numbers identifying a particular page of information which he requires. Since the system is to be operated by unskilled operators it is important that the key required be of self-evident nature and inevitably this will restrict the nature of facilities which the computer can provide. One such system is known by the name VIEWDATA, and in which the information provided by the computer is identified by a page number and when this page is keyed the whole of the data contained in that page is transmitted in coded form to the terminal where it is stored and displayed continuously, until the next page is received or the terminal switched off.

Difficulties arise in such a system, however, because of the need to ensure the simplicity of operation of the terminal, bearing in mind the likelihood that the significance of particular keying inputs may need to be varied in dependence on the data being displayed.

It is an object of the present invention to alleviate the above difficulty.

According to one aspect of the present invention there is provided an information handling system in which information is transmitted to a terminal apparatus from a computer via a telephone line, the information being transmitted to the terminal apparatus in packets, each of which is displayed by the terminal apparatus as a page consisting of a plurality of parallel lines of alphanumeric characters and/or graphical data, the terminal apparatus including means for transmitting signals to the computer via the telephone line indicating which packet or packets of information are to be transmitted by the computer, wherein information is stored by the computer in blocks each of which contains a first part consisting of the packet of information in the form of coded groups of digits representing the characters or graphical data forming the page to be displayed and a second part containing in coded form details relating to the page of information which are not displayed, means being provided for storing the second part of a block when the first part is transmitted to the terminal apparatus.

The details relating to the page of information may be retained in the computer, for example, in a special register provided for the purpose, so that inputs from the terminal apparatus can be used to select items from among the details as information or instruction data for the computer. If the system forms part of a public telephone network, it is necessary to provide a way of charging a subscriber's account for the block or blocks of information transmitted to his terminal equipment. It is envisaged that certain information may be provided at very low cost or possibly free, whereas other information such as, for example, latest stock market prices may be relatively expensive. In such a system the second part of a block may include an indication of the charging rate for information supplied in the first part, so that the computer and/or the terminal can be arranged to record the cost of the information extracted to be charged against the subscriber's account.

The second part of a block may include software, that is programming information, for simplifying entries to be made by an operator on the basis of the information displayed to him by the terminal apparatus. For example, the page of information displayed may be an index or part of an index, and to simplify keying each item of the index displayed may be indicated by a single digit. When the digit against a desired item is keyed it may be used to select full addressing information from the second part of the block, which full information is transmitted to the computer to enable the selection of the desired item. The second parts of the blocks of information may alternatively be transmitted to the terminal apparatus and stored in a special register there.

According to a second aspect of the invention there is provided a terminal apparatus for an information handling system in which information is transmitted from a computer to the terminal apparatus via a telephone line, the information being transmitted to the terminal apparatus in blocks each of which is displayable by the terminal apparatus as a page consisting of a plurality of lines of alphanumeric characters and/or graphical data, the apparatus including means for receiving blocks of information signals from a telephone line, storage means for storing a block of information signals, means for repeatedly reading at least part of the storage means, means for converting signals repeatedly read from the storage means into video signals, means for producing a prolonged visible display in response to the video signals, and means for transmitting signals to a telephone line indicating to a computer which block or blocks of information are to be transmitted, wherein the storage means has a first part for storing coded groups of digits representing alphanumeric characters or graphical data forming the page of information to be displayed, and a second part for storing the remainder of the block of information representing details relating to the page of information to be displayed.

The terminal apparatus may include data entry means, such as a manual keyboard, and means responsive to information stored in the second part of the storage means for modifying signals from the data entry means before they are applied to the transmitting means. Alternatively or additionally signals read from the second part of the storage means may be selectively, in response to the data entry means, transmitted to the telephone line for addressing other blocks of information stored in the computer.

BRIEF DESCRIPTION OF THE DRAWINGS

In order that the invention may be fully understood and readily carried into effect it will now be described with reference to the accompanying drawings, of which.

DETAILED DESCRIPTION

Figure 1:
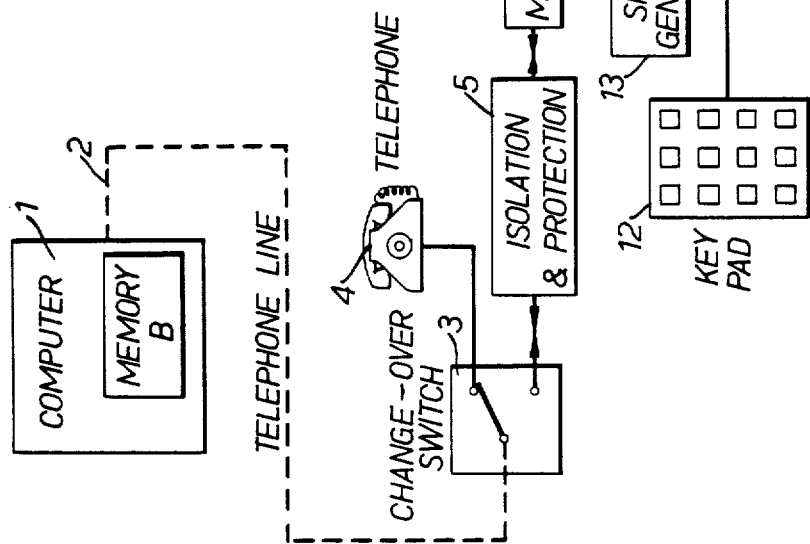
FIG. 1 shows in block diagrammatic form one example of a system according to the invention.

The system shown in FIG. 1 has a computer 1 connected by a telephone line 2 to terminal apparatus which forms the remainder of the figure. The line 2 would of course include the telephone exchange equipment normally in a public telephone system, but this is not shown to avoid complicating the figure. The terminal apparatus has a changeover switch 3 connected to the telephone line 2 which enables a telephone apparatus 4 to be connected to the line 2 when the terminal is not in use. Isolation and protection circuits 5 connect a modem 6 to the switch 3. Alternatively, the switch 3 and the circuits 5 may be replaced by an acoustic coupler for connecting the modem 6 to the telephone apparatus 4. The demodulated signals from modem 6 are applied to a memory A, reference 7, which is controlled by a memory control unit 8 repeatedly to produce coded output signals which are applied to a read only memory 9 which operates as a character generator to provide video signals for a display device 10 shown as including a cathode-ray tube. The memory control unit 8, the ROM 9 and the display device 10 are synchronised in their operation by a display control unit 11.

Inputs from an operator to the terminal apparatus are entered by means of a key pad 12 which is connected to a signal generator 13 producing signals which after modulation in the modem 6 are transmitted via the isolation and protection circuits 5 and the switch 3 to the line 2, and through that line to the computer 1.

Figure 2:
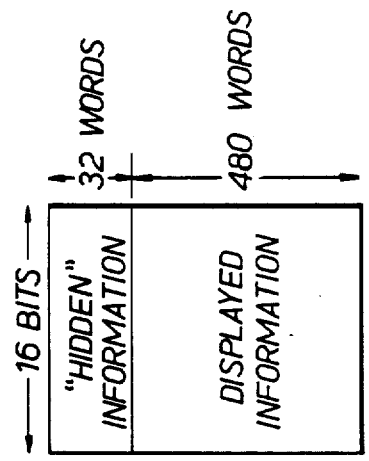
FIG. 2 is a diagram showing a block of information.

FIG. 2 is a diagram illustrating a block or "page" of information such as would be transmitted from the computer 1 to the terminal. The page consists of two parts, the first part being displayed information in response to which the display device 10 is operated, and the second part is hidden information which is related to the displayed information and may be used in various ways as described below. The displayed information consists of 960 bytes, each of eight bits, and may, for example, represent 24 lines each of 40 characters forming an alphanumeric display. The hidden information consists of 64 bytes, each of eight bits.

In the operation of the system shown, when a block of which is to be displayed is transmitted by the computer 1 to the terminal and routed to the memory A. The second part of the selected block is transferred to special memory B included in the computer 1 and associated with the input channel of the computer to which the terminal is connected. The memory control unit 8 repeatedly reads memory A which produces an eight-bit parallel output which is applied to the ROM 9. Each eight-bit parallel output from the memory A represents either an alphanumeric character or an element of a graphical display, using, for example, an ASCII code. The timing of the reading of information from the memory A is controlled by the memory control unit 8 and is synchronised with the scanning of the display device 10 and the operation of the ROM 9 by signals applied to the unit 8 from the display control unit 11, which times the operation of the ROM 9 and the scanning of the device 10, so that the information is displayed by the device 10 in the appropriate page format.

If the information displayed is an index, then it is anticipated that the operator will operate one of the keys of pad 12 to indicate which item of the displayed index he wishes to receive. The complete reference (i.e. address) of the index items could be displayed on the screen and the operator could be required to press a number of keys on the pad 12 to select a particular item. However, it would be simpler for the operator if the items of the index displayed were simply numbered, say, from 1 to 9 so that all the operator had to do was to press a single key on the pad 12 to select a particular item. This could be achieved by applying a signal from the pad 12 to the computer 1 for selecting an address in the memory B, for transfer of the full address of the particular item selected to circuit 21 of the computer. Any calculation or logical operations required could either be performed by the computer itself or in a special logic unit provided for the purpose.

It will be appreciated that the second part of each block could have other uses, both for influencing the nature of the display produced and to reduce the complexity of keying required to communicate with the computer 1. For example, the display could be of a game to be played by the operator and the reaction of the computer 1 to any particular key input would depend on the data displayed to the operator which represents the current state of the game. Information could be stored in the memory B to interpret the keying on the basis of the displayed information to feed a corresponding signal to the computer to enable it to respond to the operator's "move".

An alternative to the embodiment described above is shown in FIG. 3 in which the memory B together with associated address and input and output circuitry is located in the terminal instead of in the computer. This means that the second parts of the blocks of information must be transmitted to the terminals when selected, and that the terminal must have means for selecting signals from the memory B for transmission to the computer when information stored in the memory B is to be employed. This alternative embodiment would have an advantage if the displayed information were in the form of questions, for example, of an educational programme, because the answers could be stored in the memory B and they could be compared with answers provided by the user and entered through the keyboard without the need for further communication with the computer 1.

Figure 3:
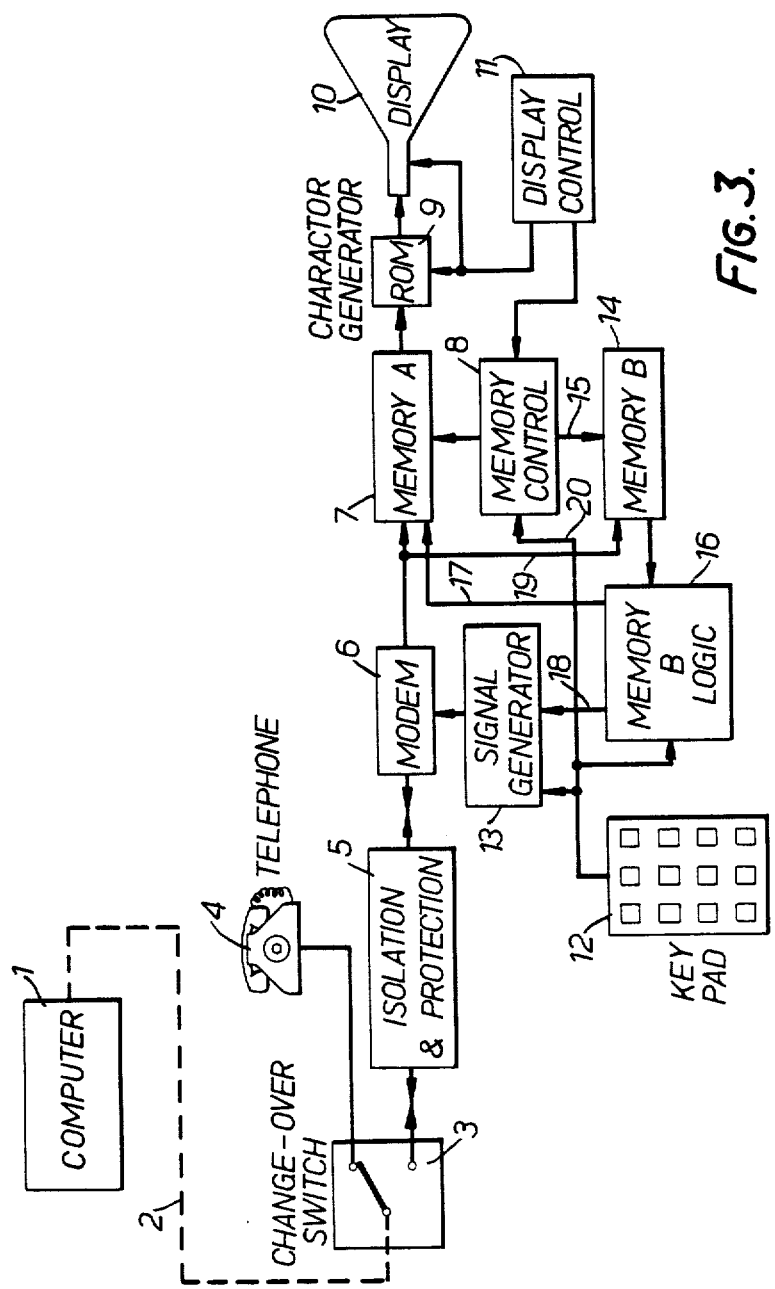
FIG. 3 shows another system according to the invention.

In FIG. 3 components corresponding to those of FIG. 1 have the same reference numerals as in that figure. In FIG. 3, the terminal includes memory B 14 which is connected to receive memory control signals from the memory control unit 8 through a line 15, and produces output signals which are applied to memory B LOGIC unit 16 to which signals from the key pad 12 are also applied. Lines 17 and 18 convey output signals from the logic unit 16 to the memory A 7 and the signal generator 13 respectively. Information to be stored in the memory B 14 is applied to it from the modem 6 via a line 19. Output signals from the key pad 12 are also applied to the memory control unit 8 along a line 20.

Insofar as the operation of FIG. 3 is the same as that of FIG. 1 it will not be further described. When a block of information is received from the computer 1, the first part is stored in memory A 7 and the second part in memory B 14 under the control of memory control unit 8. If the information stored in the memory B is used to augment or modify address data from the key pad 12, the pressing of a key of the pad 12 at this time causes the unit 8 to select the appropriate information from the memory B 8 and apply it to the logic unit 16 where it is combined with the data from the key pad and the full address transmitted via line 18, the signal generator 13, and the modem 6 to the computer 1.

Where an entry on the key pad 12 is in answer to a question, the entry is compared with the correct answer from the memory B in the logic unit 16 and the appropriate response applied via the line 17 to the memory A for display.

Although the invention has been described with reference to a specific embodiment it will be appreciated that modifications can be made to the system described without departing from the invention. In particular, the numbers of digits making up each part of a block of information may differ from those described. The memory B may be duplicated, with one memory B located in the computer 1 and the other in the terminal.

What is claimed is:

1. A digital information storage, retrieval and display system comprising:

a central computer means in which plural blocks of information are stored at respectively corresponding locations, each of which locations is designated by a predetermined address therein by means of which a block can be selected, each of said blocks comprising a first portion containing information for display and a second portion containing information not for display but including the complete address for each of plural other blocks of information;

plural remote terminal means, each including (a) modem means for effecting input/output digital data communication with said central computer means via the telephone lines of a telephone network, (b) local memory for locally storing digital data representing at least the first portion of the selected block of information received via said modem means from the central computer, (c) display means for visually displaying such a locally stored first portion of a block of information and (d) key pad means connected to communicate data to at least said modem means for manual entry of keyed digital data; and further memory means being provided as a part of said central computer means for receiving and storing said second portion of the block of information selected by a particular terminal means in response to the selection of the block and when its respective first portion is transmitted to that terminal means for display, said central computer means utilizing keyed digital data from that particular terminal means of less extent than any one of said complete addresses for another block of information but nevertheless uniquely indicative of one of the complete addresses contained in said portion of the block of information which contains the first portion then being displayed by that particular terminal means for selectively accessing the part of said further memory means associated with that particular terminal means and for supplying the complete address of the next block of information which is to be retrieved for that particular terminal means and utilized for display purposes at that terminal means.

2. A system as in claim 1 wherein the second part of a block of information includes a representation of the monetary charge to be made in respect of supplying such information for display from the central computer means which also includes means for accumulating charges derived from the second parts of such supplied blocks and for associating the charges with the terminal apparatus to which the first parts of such blocks were transmitted.

3. A digital information storage, retrieval and display system comprising:

a central computer means in which plural blocks of information are stored at respectively corresponding locations each of which locations is designated by a predetermined address therein by means of which a block can be selected, each of said blocks comprising a first portion containing information for display and a second portion containing information not for display but including the complete address for each of plural other blocks of information;

plural remote terminal means, each including (a) modem means for effecting input/output digital data communication with said central computer means via the telephone lines of a telephone network, (b) local memory means for locally storing digital data representing at least the first portion of the selected block of information received via said modem means from the central computer and for processing digital data, (c) display means for visually displaying such a locally stored first portion of a block of information and (d) keypad means connected to communicate data to at least said local memory means for manual entry of keyed digital data; and further memory means being provided as a part of said local memory means at each of said remote terminal means for receiving and storing said second portion of the selected block of information in response to the selection of the block and when its respective first portion is transmitted thereto, said local memory means utilizing keyed digital data of less extent than any one of said complete addresses for another block of information but nevertheless uniquely indicative of one of the complete addresses contained in said second portion of the block of information which contains the first portion then being displayed for selectively accessing said further memory means and for supplying data to be transmitted by said modem means and indicative of the complete address of the next block of information which is to be retrieved and utilized for display purposes.

4. A system as in claim 3 wherein the second part of a block of information includes a representation of the monetary charge to be made in respect of supplying such information for display from the central computer means which also includes means for accumulating charges derived from the second parts of such supplied blocks and for associating the charges with the terminal apparatus to which the first parts of such blocks were transmitted.

5. A terminal apparatus for use in a digital information storage, retrieval and display system having a central computer and a plurality of remote terminal apparatuses providing access via telephone lines to information stored in the central computer as plural blocks of information, each said block of information being stored at a respectively corresponding location designated by a predetermined unique address by means of which single address that complete block of information can be selected, each of said blocks comprising a first portion containing information for display at a remote terminal apparatus and a second portion containing information not for display but including the complete address for each of plural other stored blocks of information, said terminal apparatus comprising:

(a) modem means for effecting input/output digital data communications with said central computer via the telephone lines of a telephone network, (b) local memory means linked to said modem means for locally storing digital data representing at least the first portion of the selected block of information received via said modem means from the central computer, (c) display means coupled to said local memory means for visually displaying such a locally stored first portion of a block of information, (d) keypad means coupled to at least one of said modem means and said local memory means for manual entry of keyed digital data, (e) further memory means for receiving and storing said second portion of a selected block of information when its respective first portion is transmitted for display to the terminal means, and (f) means coupled to said further memory means and to said keypad means for addressing such second portion stored in said further memory means using keypad digital data of less extent than any one of said complete addresses for another block of information to address a portion of the further memory means and cause a read-out portion of the further memory means to supply the complete address of the next block of information which is to be retrieved and utilized for display purposes, the thus obtained complete address being transmissible via the modem means to said central computer.

6. A terminal apparatus as in claim 5 including means responsive to information stored in the further memory means for modifying signals derived from the keypad means to produce the signals to be transmitted by the modem to a telephone line.

7. A terminal apparatus as in claim 5 including logic means responsive to data entered through the keypad means and the second portion then stored in the further memory means, the logic means having an output connected to the local memory means which logic and local memory means jointly cause the generation of a display dependent (a) on the data entered through the keypad means and (b) on the second portion then stored in the further memory means.

* * * * *